US011447266B2

(12) United States Patent
Tajiri et al.

(10) Patent No.: US 11,447,266 B2
(45) Date of Patent: Sep. 20, 2022

(54) COMPOSITE STRUCTURE, AIRCRAFT, AND LIGHTNING CURRENT GUIDING METHOD

(71) Applicant: SUBARU CORPORATION, Tokyo (JP)

(72) Inventors: Keisuke Tajiri, Tokyo (JP); Megumi Hiraki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 894 days.

(21) Appl. No.: 16/208,888

(22) Filed: Dec. 4, 2018

(65) Prior Publication Data

US 2019/0276161 A1 Sep. 12, 2019

(30) Foreign Application Priority Data

Mar. 12, 2018 (JP) .............................. JP2018-044814

(51) Int. Cl.
*B64D 45/02* (2006.01)
*B32B 3/26* (2006.01)
(Continued)

(52) U.S. Cl.
CPC .............. *B64D 45/02* (2013.01); *B32B 3/263* (2013.01); *B32B 3/266* (2013.01); *B32B 5/26* (2013.01);
(Continued)

(58) Field of Classification Search
CPC ........ B64D 45/02; B64D 37/32; H01H 47/00; H05F 3/00; B64C 1/12; B32B 43/00;
(Continued)

(56) References Cited

U.S. PATENT DOCUMENTS 4,542,056 A * 9/1985 Anglin .................... B32B 5/024
428/116
2007/0201179 A1* 8/2007 Heeter ................... B64D 45/02
361/220

(Continued)

FOREIGN PATENT DOCUMENTS

CN 102452175 A 5/2012
JP 2014-189070 A 10/2014
(Continued)

OTHER PUBLICATIONS

Extended European Search Report dated Jul. 1, 2019 for European Patent Application No. 18211498.3-1010.
(Continued)

*Primary Examiner* — Danny Nguyen
(74) *Attorney, Agent, or Firm* — McGinn I.P. Law Group, PLLC.

(57) ABSTRACT

A composite structure includes a composite member and a fastener. The composite member has a through hole. The fastener is inserted in the through hole and couples the composite member and another part to each other. The composite member includes an electrically-conductive composite member provided at least in part or all of a through-hole portion. The through-hole portion is a portion, of the composite member, having the through hole. The electrically-conductive composite member has a thickness that is greater in a portion, of the electrically-conductive composite member, included in the through-hole portion than in a portion, of the electrically-conductive composite member, other than the through-hole portion.

14 Claims, 5 Drawing Sheets

(51) Int. Cl.
  *B32B 5/26* (2006.01)
  *B64C 1/00* (2006.01)
  *H02G 13/00* (2006.01)

(52) U.S. Cl.
  CPC ...... *B64C 2001/0072* (2013.01); *H02G 13/80* (2013.01)

(58) Field of Classification Search
  CPC ... B32B 27/40; F16B 5/04; F16B 1/00; H02G 13/80
  USPC .......................................... 361/212, 218, 220
  See application file for complete search history.

(56) References Cited

U.S. PATENT DOCUMENTS

| | | | |
|---|---|---|---|
| 2010/0061031 A1* | 3/2010 | Lopez-Reina Torrijos | B29C 70/885 361/218 |
| 2012/0121854 A1 | 5/2012 | Yoshida et al. | |
| 2012/0145825 A1* | 6/2012 | Granado Macarrilla | F16B 5/04 244/1 A |
| 2014/0208576 A1 | 7/2014 | Warren | |
| 2016/0052638 A1 | 2/2016 | Kamihara et al. | |
| 2016/0082691 A1 | 3/2016 | Restuccia et al. | |
| 2017/0341774 A1 | 11/2017 | Ding | |

FOREIGN PATENT DOCUMENTS

| WO | WO 01/58680 A1 | 8/2001 |
|---|---|---|
| WO | WO 2020/116017 A1 | 6/2020 |

OTHER PUBLICATIONS

European Office Action, dated Oct. 9, 2020, in European Application No. 18 211 498.3-1010.

* cited by examiner

COMPOSITE STRUCTURE, AIRCRAFT, AND LIGHTNING CURRENT GUIDING METHOD

CROSS-REFERENCE TO RELATED APPLICATIONS

The present application claims priority from Japanese Patent Application No. 2018-044814 filed on Mar. 12, 2018, the entire contents of which are hereby incorporated by reference.

BACKGROUND

Some implementations of the technology relates to a composite structure, an aircraft, and a lightning current guiding method.

A measure against a lightning strike may be necessary in designing an aircraft. A typical measure against a lightning strike on an aircraft may be prevention of a spark between a metallic fastener and a hole in which the fastener is inserted, for example, as disclosed in Japanese Unexamined Patent Application Publication No. 2014-189070.

SUMMARY

An aspect of the technology provides a composite structure that includes at least one composite member and at least one fastener. The composite member has a through hole. The fastener is inserted in the through hole and couples the at least one composite member and another part to each other. The composite member includes an electrically-conductive composite member provided at least in part or all of a through-hole portion. The through-hole portion is a portion, of the composite member, having the through hole. The electrically-conductive composite member has a thickness that is greater in a portion, of the electrically-conductive composite member, included in the through-hole portion than in a portion, of the electrically-conductive composite member, other than the through-hole portion.

An aspect of the technology provides an aircraft including a composite structure. The composite member has a through hole. The fastener is inserted in the through hole and couples the at least one composite member and another part to each other. The composite member includes an electrically-conductive composite member provided at least in part or all of a through-hole portion. The through-hole portion is a portion, of the composite member, having the through hole. The electrically-conductive composite member has a thickness that is greater in a portion, of the electrically-conductive composite member, included in the through-hole portion than in a portion, of the electrically-conductive composite member, other than the through-hole portion.

An aspect of the technology provides a lightning current guiding method including: making at least part or all of a through-hole portion of a composite member with an electrically-conductive composite member, the composite member being included in a composite structure, the composite member having a through hole and being coupled to another part by a fastener, the fastener being inserted in the through hole of the composite member, the through-hole portion being a portion, of the composite member, having the through hole; causing the electrically-conductive composite member to have a thickness that is greater in a portion, of the electrically-conductive composite member, included in the through-hole portion than in a portion, of the electrically-conductive composite member, other than the through-hole portion; and guiding a lightning current to the electrically-conductive composite member.

DETAILED DESCRIPTION

Figure 1:
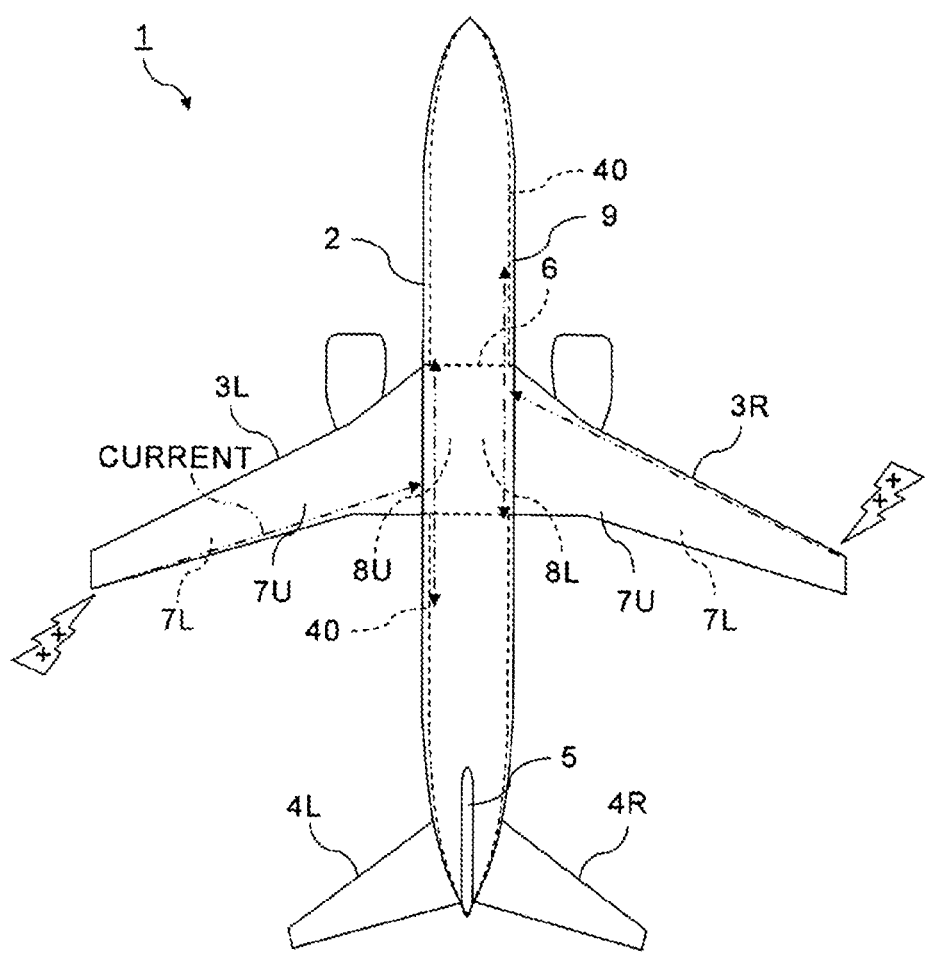
FIG. 1 is a top view of an example of an aircraft including a composite structure according to one implementation of the technology.

In the following, a composite structure, an aircraft, and a lightning current guiding method according to some example implementations of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting the technology. Further, elements in the following example implementations which are not recited in a most-generic independent claim of the disclosure are optional and may be provided on an as-needed basis. Throughout the present specification and the drawings, elements having substantially the same function and configuration are denoted with the same numerals to avoid any redundant description.

Recently, use of a composite as a material of an aircraft has been increasing. The composite includes resin reinforced by means of fibers. Non-limiting examples of the composite may include glass fiber reinforced plastics (GFRP) and carbon fiber reinforced plastics (CFRP).

It is more difficult for the composite to allow an electric current to flow therethrough. Therefore, when a part including the composite is coupled to another part by means of a fastener that is highly electrically conductive, a possibility that a spark occurs between the composite part and the fastener due to a lightning current may be increased. This is applicable not only to an aircraft but also to a composite structure having a structure that involves coupling of a part including the composite by means of a fastener.

It is desirable to reduce a possibility of occurrence of a spark due to a lightning current in a composite structure having a structure that involves coupling of a part including a composite by means of a fastener.

First Example Implementation

Figure 2:
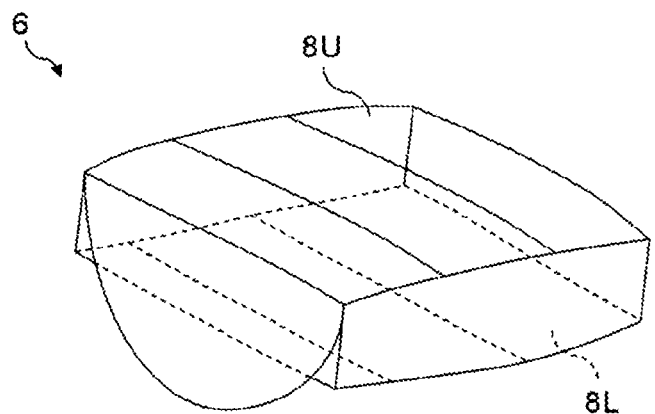
FIG. 2 is a perspective view of an example of a center wing of the aircraft illustrated in FIG. 1.

FIG. 1 is a top view of an example of an aircraft 1 including a composite structure according to a first example implementation of the technology. FIG. 2 is a perspective view of an example of a center wing of the aircraft 1 illustrated in FIG. 1.

Referring to FIG. 1, the aircraft 1 may have a structure that includes a fuselage 2 provided with aircraft structures including a right main wing 3R, a left main wing 3L, a right horizontal stabilizer 4R, a left horizontal stabilizer 4L, and a vertical stabilizer 5. A portion, of the fuselage 2, that couples the right main wing 3R and the left main wing 3L to each other may be referred to as a center wing 6. Each of the aircraft structures including the fuselage 2, the right main wing 3R, the left main wing 3L, the right horizontal stabilizer 4R, the left horizontal stabilizer 4L, and the vertical stabilizer 5 may have a structure in which a reinforcing member is attached to a panel. Non-limiting examples of the reinforcing member may include a spar, a rib, and a stringer.

For example, each of the right main wing 3R and the left main wing 3L may have a box structure in which an upper panel 7U and a lower panel 7L are reinforced by means of a front spar, a rear spar, a plurality of ribs, and a plurality of stringers. Fuel may be stored inside the right main wing 3R and the left main wing 3L, or inside a fuel tank contained in each of the right main wing 3R and the left main wing 3L. The center wing 6 may also have a box structure in which an upper panel 8U and a lower panel 8L are reinforced by means of a reinforcing member as exemplarily illustrated in FIG. 2.

Each of the aircraft structures including the fuselage 2, the right main wing 3R, the left main wing 3L, the right horizontal stabilizer 4R, the left horizontal stabilizer 4L, and the vertical stabilizer 5 may include a composite structure 9. Part or all of the composite structure 9 may include fiber reinforced plastics (FRP) as its material. The FRP is a material including resin reinforced by means of fibers. The FRP is also referred to as a composite, and may include a structure including a stack of fiber-reinforced resin layers. Non-limiting typical examples of the composite may include CFRP and GFRP. The CFRP includes resin reinforced by means of carbon fibers. The GFRP includes resin reinforced by means of glass fibers.

Figure 3:
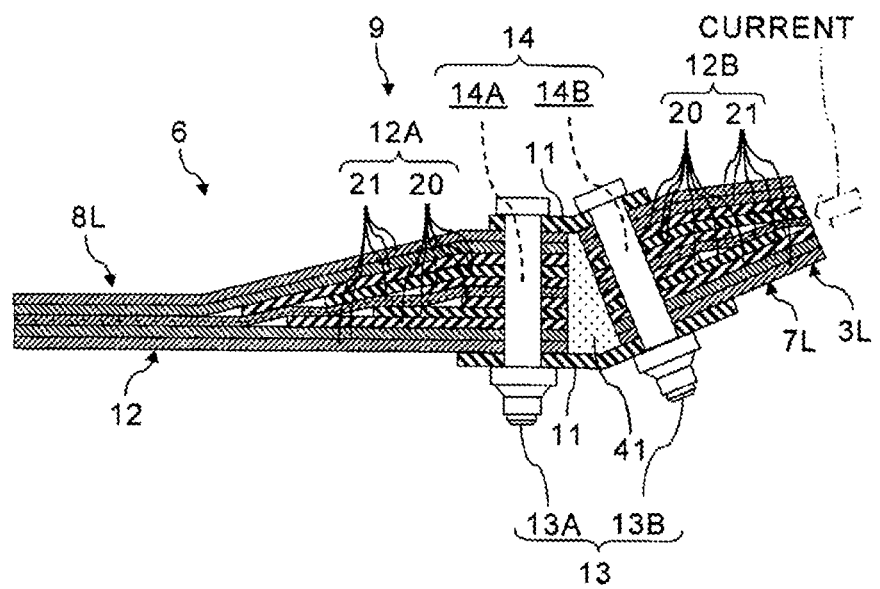
FIG. 3 is a cross-sectional view of an example of a portion coupling a lower panel of the center wing illustrated in FIG. 2 and a lower panel of a main wing.

FIG. 3 is a cross-sectional view of an example of a portion coupling the lower panel 8L of the center wing 6 illustrated in FIG. 2 and the lower panel 7L of the left main wing 3L.

As exemplarily illustrated in FIG. 3, the lower panel 8L of the center wing 6 and the lower panel 7L of the left main wing 3L may be coupled to each other with a pair of brackets 11. It is to be noted that some appropriate parts may be assembled between the lower panel 8L of the center wing 6 and the lower panel 7L of the left main wing 3L; however, details of those appropriate parts are not illustrated.

Further, the lower panel 7L of the right main wing 3R and the lower panel 8L of the center wing 6 may be similarly coupled to each other by means of the pair of brackets 11. The upper panel 7U of the right main wing 3R and the upper panel 8U of the center wing 6 may be similarly coupled to each other by means of the pair of brackets 11. The upper panel 7U of the left main wing 3L and the upper panel 8U of the center wing 6 may be similarly coupled to each other by means of the pair of brackets 11. In the following, a description is given, mainly with reference to FIG. 3, of an example of a coupling structure between the lower panel 8L of the center wing 6 and the lower panel 7L of the left main wing 3L. The description may be similarly applicable, however, to each of: a coupling structure between the lower panel 7L of the right main wing 3R and the lower panel 8L of the center wing 6; a coupling structure between the upper panel 7U of the right main wing 3R and the upper panel 8U of the center wing 6; and a coupling structure between the upper panel 7U of the left main wing 3L and the upper panel 8U of the center wing 6.

In a case where the center wing 6 and the left main wing 3L include the composite structure 9, the lower panel 8L of the center wing 6 and the lower panel 7L of the left main wing 3L may include a composite member 12. The composite member 12 may include resin reinforced by means of fibers. For example, the composite member 12 may include CFRP. Accordingly, each of the lower panel 8L of the center wing 6 and the lower panel 7L of the left main wing 3L may have a structure including a stack of fiber-reinforced resin layers.

The lower panel 8L of the center wing 6 may include a first composite member 12A. The first composite member 12A may have a first through hole 14A into which a first fastener 13A is to be inserted. Similarly, the lower panel 7L of the left main wing 3L may include a second composite member 12B. The second composite member 12B may have a second through hole 14B into which a second fastener 13B is to be inserted.

The first fastener 13A may be inserted in the first through hole 14A of the first composite member 12A, and the second fastener 13B may be inserted in the second through hole 14B of the second composite member 12B. The pair of brackets 11 may be coupled to the first composite member 12A on both sides of the first composite member 12A by means of the first fastener 13A. The pair of brackets 11 may be also coupled to the second composite member 12B on both sides of the second composite member 12B by means of the second fastener 13B. In other words, the first fastener 13A may couple the first composite member 12A to the pair of brackets 11, and the second fastener 13B may couple the second composite member 12B to the pair of brackets 11.

As a result, the first composite member 12A included in the lower panel 8L of the center wing 6 and the second composite member 12B included in the lower panel 7L of the left main wing 3L may be coupled to each other by means of the pair of brackets 11.

A local load on an end of the lower panel 8L of the center wing 6 and an end of the lower panel 7L of the left main wing 3L may be greater than a load on other portions. The end of the lower panel 8L of the center wing 6 and the end of the lower panel 7L of the left main wing 3L may be coupled to each other by means of the brackets 11. Hence, it may be necessary to provide both of an end of the first composite member 12A and an end of the second composite member 12B with strength that allows both of the end of the first composite member 12A and the end of the second composite member 12B to bear the local load described above. The end of the first composite member 12A and the end of the second composite member 12B may be coupled to each other by means of the brackets 11.

Accordingly, each of a thickness of the end of the first composite member 12A having a plate shape and a thickness of the end of the second composite member 12B having a plate shape may be designed to be greater than a thickness of other portions. For example, more fiber-reinforced resin layers may be stacked at each of the end of the first composite member 12A and the end of the second composite member 12B than at other portions. It is to be noted that a portion having a partially-increased thickness as a result of thus providing additional fiber-reinforced resin layers may be also referred to as a PadUp portion.

It has been known that, in a case where the aircraft 1 is struck by lightning, a probability that a sharper portion of the aircraft 1 is struck by the lightning is higher. Non-limiting examples of the sharper portion of the aircraft 1 may include a wingtip of the right main wing 3R, a wingtip of the left main wing 3L, a front end of the fuselage 2, and a rear end of the fuselage 2. The lightning is classified into two types: positive lightning including positive ion plasma and negative lightning including electrons or negative ion plasma.

When the aircraft 1 is struck by positive lightning, a lightning strike point may serve as an entrance of a lightning current. The lightning strike point may be a point at which the aircraft 1 is struck by the lightning. Further, the lightning current may flow from the lightning strike point through the aircraft 1 and positive electric discharge may occur at an exit of the lightning current. The exit of the lightning current may be located at a position different from that of the lightning strike point. In contrast, when the aircraft 1 is struck by negative lightning, a lightning strike point may serve as an exit of a lightning current. Further, electrons may flow from the lightning strike point through the aircraft 1 and negative electric discharge may occur at an entrance of the lightning current. The entrance of the lightning current may be located at a position different from that of the lightning strike point. In other words, when the aircraft 1 is struck by lightning, a lightning current flows through the aircraft 1 while the lightning strike point serves as an entrance or an exit of the lightning current. Further, electric discharge occurs at a position different from that of the lightning strike point. It is to be noted that, in some cases, the lightning current flowing through the aircraft 1 may be branched, causing occurrence of electric discharge at a plurality of positions.

Moreover, a lightning current has a property of flowing straight. Therefore, in a case where positive lightning strikes any of the wingtip of the right main wing 3R and the wingtip of the left main wing 3L as illustrated in FIG. 1, a lightning current may often flow toward the fuselage 2 from the one, struck by the positive lightning, of the wingtip of the right main wing 3R and the wingtip of the left main wing 3L. Upon the flowing of the lightning current, there may be a possibility that a spark occurs at a gap between parts of the aircraft 1. If the spark ignites the fuel stored in the fuel tank in each of the right main wing 3R and the left main wing 3L, a concern may rise. Hence, the fuel tank may be insulated sufficiently.

As a result, in a case where the lightning current flows from any of the wingtip of the right main wing 3R and the wingtip of the left main wing 3L toward the fuselage 2, the lightning current may flow through the second composite member 12B included in the lower panel 7L of the corresponding one of the right main wing 3R and the left main wing 3L or the second composite member 12 included in the upper panel 7U of the corresponding one of the right main wing 3R and the left main wing 3L. Similarly, in a case where negative lightning strikes any of the wingtip of the right main wing 3R and the wingtip of the left main wing 3L, electrons flow from the one, struck by the negative lightning, of the wingtip of the right main wing 3R and the wingtip of the left main wing 3L toward the fuselage 2 through the second composite member 12B included in the lower panel 7L of the corresponding one of the right main wing 3R and the left main wing 3L or the second composite member 12 included in the upper panel 7U of the corresponding one of the right main wing 3R and the left main wing 3L.

Accordingly, a probability that a spark occurs may increase around each of: the fastener 13 coupling the upper panel 7U of the right main wing 3R and the upper panel 8U of the center wing 6 to each other; the fastener 13 coupling the upper panel 7U of the left main wing 3L and the upper panel 8U of the center wing 6 to each other; the fastener 13 coupling the lower panel 7L of the right main wing 3R and the lower panel 8L of the center wing 6 to each other; and the fastener 13 coupling the lower panel 7L of the left main wing 3L and the lower panel 8L of the center wing 6 to each other.

To address this, an electrically-conductive composite member 20 may be included at least in part or all of a portion, having the through hole 14, of each of the composite members 12 included in the upper panel 7U of the right main wing 3R, the upper panel 7U of the left main wing 3L, the lower panel 7L of the right main wing 3R, the lower panel 7L of the left main wing 3L, the upper panel 8U of the center wing 6, and the lower panel 8L of the center wing 6. The foregoing through hole 14 may encompass the first through hole 14A and the second through hole 14B. Further, the electrically-conductive composite member 20 may be provided with a thickness that is greater in portions, of the electrically-conductive composite member 20, having the through hole 14 into which the fastener 13 is inserted than in other portions of the electrically-conductive composite member 20. The portions, of the electrically-conductive composite member 20, having the through hole 14 described above may encompass a portion, of the electrically-conductive composite member 20, having the first through hole 14A in which the first fastener 13A is inserted and a portion, of the electrically-conductive composite member 20, having the second through hole 14B in which the second fastener 13B is inserted.

For example, as exemplarily illustrated in FIG. 3, part or all of the first composite member 12A and part or all of the second composite member 12B may include the electrically-conductive composite member 20. Further, the electrically-conductive composite member 20 may have a thickness greater in the portions, of the electrically-conductive composite member 20, having the first through hole 14A and the second through hole 14B than in other portions of the electrically-conductive composite member 20. In other words, the electrically-conductive composite member 20 may have a thickness that is greater in a portion, of the electrically-conductive composite member 20, between the pair of brackets 11 coupling the first composite member 12A and the second composite member 12B to each other than in other portions of the electrically-conductive composite member 20. In the example illustrated in FIG. 3, the thickness of the electrically-conductive composite member 20 may be gradually increased in a direction from a portion, of the electrically-conductive composite member 20, away from the through hole 14 toward the through hole 14. The through hole 14 described above may encompass the first through hole 14A and the second through hole 14B.

Accordingly, in a case where a lightning current flows through any of: the upper panel 7U of the right main wing 3R; the upper panel 7U of the left main wing 3L; the lower panel 7L of the right main wing 3R; and the lower panel 7L of the left main wing 3L, the lightning current is guided to the electrically-conductive composite member 20. Further, a current density of the lightning current is decreased around the through hole 14 in which the fastener 13 is inserted. The through hole 14 described above may encompass the first through hole 14A in which the first fastener 13A is inserted and the second through hole 14B in which the second fastener 13B is inserted. For example, the lightning current is caused to flow in a thickness direction of any of the foregoing panels, preventing the lightning current from concentrating on a surficial layers of the foregoing panels and the portions around the fasteners 13.

As a result, a possibility of occurrence of a spark between the fastener 13 and the composite member 12 is reduced. The spark between fastener 13 and the composite member 12 may encompass, for example, a spark between the first fastener 13A and the first composite member 12A, and a spark between the second fastener 13B and the second composite member 12B. For example, occurrence of a spark at a gap between the fastener 13 and the composite member 12 and occurrence of a spark between a head of the fastener 13 and the composite member 12 are prevented.

As described above, increasing of the thickness of the electrically-conductive composite member 20 around the fastener 13 reduces a possibility of occurrence of a spark around the fastener 13. In addition, the increasing of the thickness of the electrically-conductive composite member 20 also increases the thickness of the first composite member 12A itself and the thickness of the second composite member 12B itself. This provides both of the end of the first composite member 12A and the end of the second composite member 12B with strength that allows both of the end of the first composite member 12A and the end of the second composite member 12B to bear the greater local load as described above.

The electrically-conductive composite member 20 may include CFRP that is electrically-conductive resin reinforced by means of carbon fibers. Therefore, both the resin and carbon included in the electrically-conductive composite member 20 may serve as lightning-current conductors. The electrically-conductive resin may include, for example but not limited to, resin mixed with carbon such as carbon nanotube, resin mixed with metallic powder, or resin mixed with an electrically-conductive polymer.

The electrically-conductive composite member 20 may be higher in cost. Therefore, partially including a non-electrically-conductive composite member 21 in the first composite member 12A and the second composite member 12B may reduce a material cost. Non-limiting examples of a material included in the non-electrically-conductive composite member 21 may include CFRP and GFRP. As a non-limiting practical example, the non-electrically-conductive composite member 21 having a plate shape with a uniform thickness and the electrically-conductive composite member 20 having a plate shape with a non-uniform thickness may be stacked to provide each of the first composite member 12A and the second composite member 12B as exemplarily illustrated in FIG. 3. This may be similarly applicable to a portion coupling the composite member 12 included in the upper panel 7U of each of the right main wing 3R and the left main wing 3L and the composite member 12 included in the upper panel 8U of the center wing 6 to each other.

As one example, each of the foregoing panels may include a hybrid stack including the fiber-reinforced resin layer. For example, the electrically-conductive composite member 20 may be used only in ply of the PadUp portion of the panel, and the non-electrically-conductive composite member 21 may be used in ply of portions, of the panel, other than the PadUp portion. In the example illustrated in FIG. 3, the non-electrically-conductive composite member 21 may be included in the ply of a surficial layer of the panel and ply of the central portion of the panel. Further, ply including the electrically-conductive composite member 20 may be additionally provided between the ply of the surficial layer of the panel and the ply of the central portion of the panel, thus providing the PadUp portion. This reduces a usage amount of the electrically-conductive composite member 20 which is higher in cost.

In contrast, the electrically-conductive composite member 20 may be included in all of the composite members 12 including the first composite member 12A and the second composite member 12B. In this case, it is easier to guide a lightning current to the electrically-conductive composite member 20. This further reduces the possibility of occurrence of a spark around the fastener 13.

A method of inserting the fastener 13 into the through hole 14 of the composite member 12 may be a clearance fit method or may be an interference fit method, for example. The interference fit method may be also referred to as a transition fit method.

Figure 4:
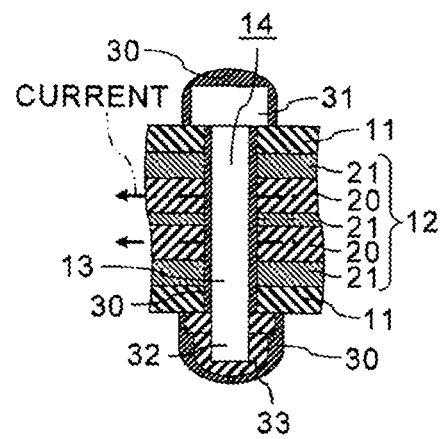
FIG. 4 is a vertical cross-sectional view of an example in which a fastener is inserted in a through hole of a composite member illustrated in drawings such as FIG. 3 by a clearance fit method.

FIG. 4 illustrates a vertical cross-section of an example in which the fastener 13 is inserted in the through hole 14 of the composite member 12 illustrated in FIG. 3 or any other drawing by the clearance fit method.

As exemplarily illustrated in FIG. 4, by the clearance fit method, the fastener 13 may be inserted in the through hole 14 without being in contact with the composite member 12. Therefore, a cylindrical gap may be provided between the fastener 13 and the composite member 12 inside the through hole 14. In other words, the fastener 13 having electric conductivity may be inserted in the through hole 14 without being in contact with the composite member 12.

In a typical example, an insulator 30 may be disposed between the fastener 13 and the composite member 12, allowing the fastener 13 to be insulated. For example, the fastener 13 may be coated with an insulating sealant and inserted into the through hole 14. In another example, the fastener 13 may be inserted in a cylindrical insulating sleeve, and the fastener 13 may be inserted into the through hole 14 together with the insulating sleeve. Further, a part that protrudes from the through hole 14 of the composite member 12 may be insulated on an as-needed basis by means of the insulator 30. Non-limiting examples of the part that protrudes from the through hole 14 of the composite member 12 may include a head 31 of the fastener 13 and a cap nut 33 fastened onto a tip 32 of the fastener 13. Non-limiting examples of the insulator 30 may include an insulating cap and insulating paint.

This reduces a possibility that a lightning current flows through the fastener 13 also in a case where the fastener 13 has electric conductivity. In other words, a probability that a lightning current path avoiding the fastener 13 is provided is increased.

In a case where the fastener 13 is attached by the clearance fit method as in the example illustrated in FIG. 4, a gap may be present between the fastener 13 and the composite member 12. This allows for an increase in an acceptable range of a manufacturing error between the fastener 13 and the composite member 12. This also allows for avoidance of damaging the composite member 12 upon attachment or detachment of the fastener 13.

It is to be noted that, when electric resistance of the electrically-conductive composite member 20 is sufficiently smaller than that of the fastener 13, a lightning current flows more easily through the electrically-conductive composite member 20 than through the fastener 13. This allows for omittance of part or all of the insulator 30 directed to insulation of the fastener 13. In this case, manufacturing cost of the composite structure 9 is reduced while the possibility of occurrence of a spark around the fastener 13 is reduced.

Figure 5:
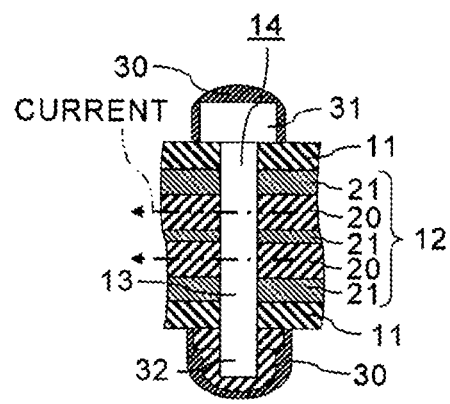
FIG. 5 is a vertical cross-sectional view of an example in which the fastener is inserted in the through hole of the composite member illustrated in diagrams such as FIG. 3 by an interference fit method.

FIG. 5 illustrates a vertical cross-section of an example in which the fastener 13 is inserted in the through hole 14 of the composite member 12 illustrated in FIG. 3 or any other drawing by the interference fit method.

As exemplarily illustrated in FIG. 5, by the interference fit method, the fastener 13 may be inserted in the through hole 14 with being in contact with the composite member 12. Therefore, in a case where the fastener 13 has electric conductivity, the fastener 13 may be electrically coupled to the electrically-conductive composite member 20. As a result, the fastener 13 may serve as a conductor that allows a lightning current to pass therethrough.

It is to be noted that a part that protrudes from the through hole 14 of the composite member 12 may be insulated on an as-needed basis by means of the insulator 30 also in the case where the fastener 13 is fastened by the interference fit method as with in the case where the fastener 13 is fastened by the clearance fit method. Non-limiting examples of the part that protrudes from the through hole 14 of the composite member 12 may include the head 31 of the fastener 13 and the cap nut 33 fastened onto the tip 32 of the fastener 13. Non-limiting examples of the insulator 30 may include the insulating cap and the insulating paint.

In the case where the fastener 13 is fastened by the interference fit method, a gap may not be present between the fastener 13 and the composite member 12. This further reduces the possibility of occurrence of a spark compared with the case where the fastener 13 is fastened by the clearance fit method as exemplarily illustrated in FIG. 4. Therefore, advantages of the interference fit method may be utilized in a case without frequent attachment and detachment of the fastener 13.

In a case where the second fastener 13B illustrated in FIG. 3 is fastened to the second composite member 12B illustrated in FIG. 3 by the clearance fit method as exemplarily illustrated in FIG. 4, a lightning current that flows from the surficial layer of the lower panel 7L to the electrically-conductive composite member 20 in a direction from the wingtip of the left main wing 3L toward the fuselage 2 may reach the end of the electrically-conductive composite member 20 without flowing into the second fastener 13B.

In contrast, in a case where the second fastener 13B illustrated in FIG. 3 is fastened to the second composite member 12B illustrated in FIG. 3 by the interference fit method as exemplarily illustrated in FIG. 5, a lightning current that flows from the surficial layer of the lower panel 7L to the electrically-conductive composite member 20 in a direction from the wingtip of the left main wing 3L toward the fuselage 2 may reach the end of the electrically-conductive composite member 20 via the second fastener 13B.

Therefore, when the brackets 11 coupling the lower panel 7L of the left main wing 3L and the lower panel 8L of the center wing 6 to each other include an electric conductor, a lightning current may flow from the electrically-conductive composite member 20 included in the lower panel 7L of the left main wing 3L to the electrically-conductive composite member 20 included in the lower panel 8L of the center wing 6 via the brackets 11. Non-limiting examples of the electric conductor may include metal. In other words, the lightning current that has been flowed from the wingtip of the left main wing 3L may flow into the center wing 6 via the brackets 11.

This may be also applicable, for example, to a case where a lightning current flows in at any of: the wingtip of the lower panel 7L of the right main wing 3R; the wingtip of the upper panel 7U of the right main wing 3R; and the wingtip of the upper panel 7U of the left main wing 3L, serving as an entrance. This may be also applicable, for example, to a case where electrons flow from any of the wingtips of the foregoing panels as a result of a negative lightning strike. In other words, in a case where lightning strikes any of the wingtips of the right main wing 3R and the left main wing 3L, a path may be formed of a lightning current that flows from the surficial layer of the panel of the corresponding one of the right main wing 3R and left main wing 3L to the electrically-conductive composite member 20 of the center wing 6 via the electrically-conductive composite member 20 and the brackets 11.

Accordingly, as illustrated in FIG. 1, the electrically-conductive composite member 20 included in each of the lower panel 8L and the upper panel 8U of the center wing 6 may be coupled to an electric conductor 40. The electric conductor 40 may be provided from the center wing 6 to at a front end of the fuselage 2, a rear end of the fuselage 2, or both along the panel of the fuselage 2. In other words, the first composite member 12A including the electrically-conductive composite member 20 may be included in part or all of the panels such as the upper panel 8U of the center wing 6 of the aircraft 1 or the lower panel 8L of the center wing 6 of the aircraft 1. Further, the second composite member 12B including the electrically-conductive composite member 20 may be included in part or all of the panels such as: the upper panel 7U of the right main wing 3R of the aircraft 1; the lower panel 7L of the right main wing 3R of the aircraft 1; the upper panel 7U of the left main wing 3L of the aircraft 1; or the lower panel 7L of the left main wing 3L of the aircraft 1. Further, the electrically-conductive composite member 20 included in part or all of the panel of the center wing 6 may be coupled to the electric conductor 40 having an end provided at least at the front end of the aircraft 1, the rear end of the aircraft 1, or both. A material of the electric conductor 40 is not limited to metal and may be a desired material such as an electrically-conductive composite, as long as the electric conductor 40 provides a path that guides a lightning current.

The above-described configuration allows a lightning current that has flown from any of the right main wing 3R and the left main wing 3L into the center wing 6 or a flow of electrons from any of the right main wing 3R and the left main wing 3L into the center wing 6 to be guided to the front end of the aircraft 1, the rear end of the aircraft 1, or both. Further, the above-described configuration allows occurrence of electric discharge while allowing the front end of the fuselage 2, the rear end of the fuselage 2, or both to serve as an exit of the electric current or the flow of electrons. The front end and the rear end of the fuselage 2 may serve as the front end and the rear end of the aircraft 1, respectively. As a result, the lightning current is prevented from flowing into a portion which requires avoidance of a lightning current flow. Non-limiting examples of the portion which requires avoidance of a lightning current flow may include an aircraft cabin and electronic parts. For example, when the lightning current or the flow of electrons is branched toward the front end side of the fuselage 2 and the rear end side of the fuselage 2, a current density is decreased and safety is increased.

It is to be noted that, in one example, a gap between the first composite member 12A included in the center wing 6 and the second composite member 12B included in any of the right main wing 3R and the left main wing 3L may be provided with an adhesive 41 having electric conductivity, as exemplarily illustrated in FIG. 3. In another example, the first composite member 12A and the second composite member 12B may be coupled to each other by means of an electric conductor. The adhesive 41 having electric conductivity may be manufactured by mixing any of metal, carbon, and an electrically-conductive polymer into an adhesive.

The above-described configuration may provide a lightning current path also in a portion other than the brackets 11. This allows the lightning current or the flow of electrons from the end of any of the right main wing 3R and the left main wing 3L to be more appropriately guided to the electrically-conductive composite member 20 included in the center wing 6.

It is to be noted that, although the case where the electrically-conductive composite member 20 is used in the portions coupling the center wing 6 to the left main wing 3L and the right main wing 3R has been described referring to the above-described examples, the electrically-conductive composite member 20 may be similarly used also in a case where the fastener 13 that couples the composite member 12 to any other part is inserted in the through hole 14 of the composite member 12. For example, in the composite structure 9 in which the composite member 12 is coupled to any other part by means of the fastener 13 inserted in the through hole 14 of the composite member 12, the electrically-conductive composite member 20 may be included in part or all of the composite member 12. Further, a thickness of the electrically-conductive composite member 20 may be made greater in a portion, of the electrically-conductive composite member 20, having the through hole 14 than in other portions of the electrically-conductive composite member 20. This allows a lightning current to be guided to the electrically-conductive composite member 20.

Example Effects

According to any of the aircraft 1, the composite structure 9, and the lightning current guiding method of the above-described example implementations, a lightning current is allowed to be guided to the electrically-conductive composite member 20 around the fastener 13. Hence, it is possible to reduce a possibility of occurrence of a spark around the fastener 13. As a result, it is also possible to prevent the spark from igniting fuel.

Moreover, in a case where the fastener 13 is attached by the clearance fit method, a process of insulating the fastener 13 is made easier. For example, a process of covering the fastener 13 by means of a part such as a cap sealant or a sleeve may be omitted. Hence, it is possible to reduce manufacturing cost of the aircraft 1 and the composite structure 9.

Second Example Implementation

Figure 6:
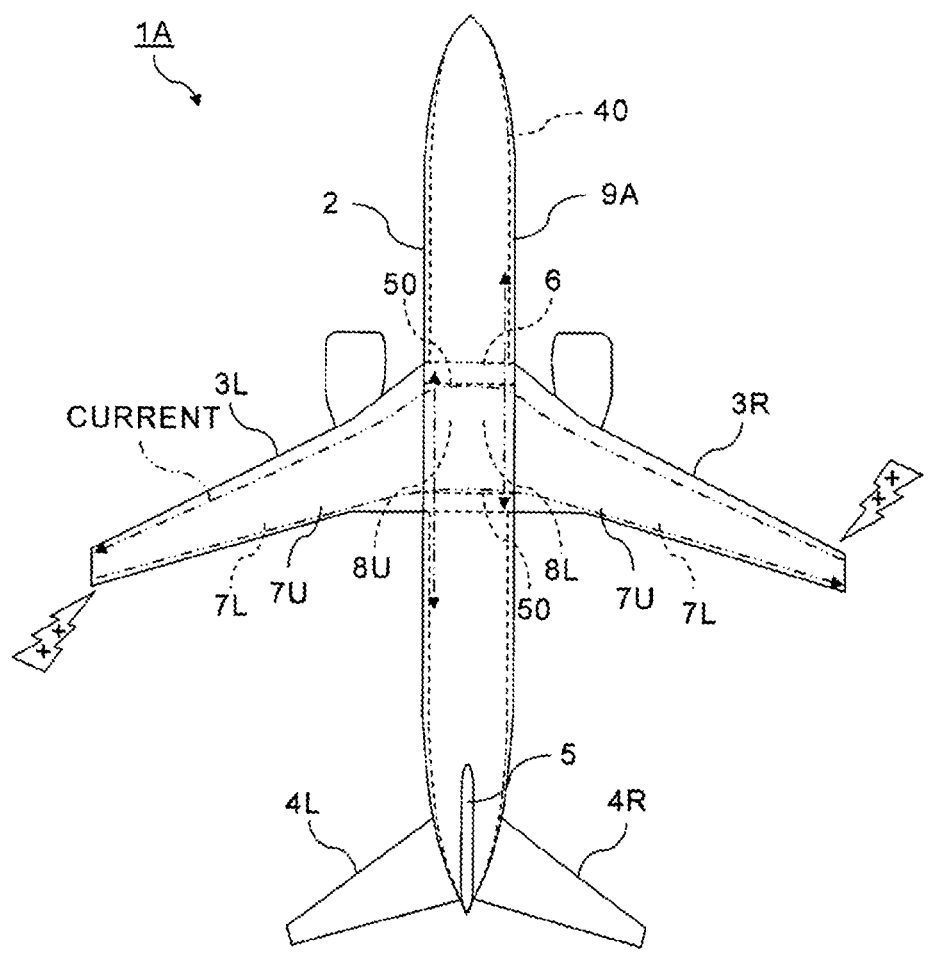
FIG. 6 is a top view of an example of an aircraft including a composite structure according to one implementation of the technology.
Figure 7:
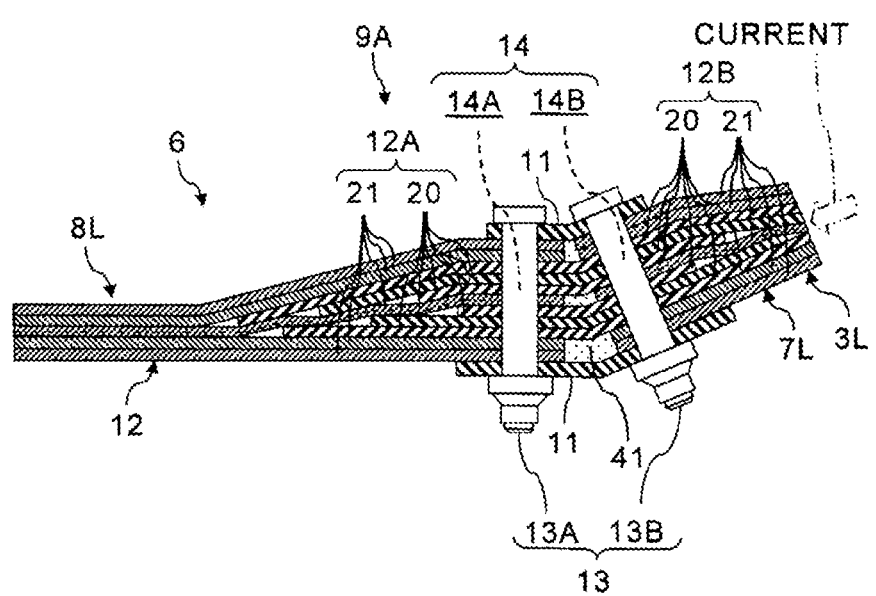
FIG. 7 is a cross-sectional view of an example of a portion coupling a lower panel of a center wing and a lower panel of a main wing illustrated in FIG. 6.

FIG. 6 is a top view of an aircraft 1A including a composite structure 9A according to a second example implementation of the technology. FIG. 7 is a cross-sectional view of a portion coupling the lower panel 8L of the center wing 6 and the lower panel 7L of the left main wing 3L to each other. The lower panel 8L of the center wing 6 and the lower panel 7L of the left main wing 3L are both illustrated in FIG. 6

The aircraft 1A and the composite structure 9A according to the second example implementation illustrated in FIGS. 6 and 7 may be different from the aircraft 1 and the composite structure 9 according to the first example implementation in the following points. Firstly, in the aircraft 1A and the composite structure 9 according to the second example implementation, the electrically-conductive composite member 20 may be shared by part of the panel of the center wing 6 and part of the panel of any of the right main wing 3R and the left main wing 3L. The electrically-conductive composite member 20 may include a stack of fiber-reinforced layers shared by part of the panel of the center wing 6 and part of the panel of any of the right main wing 3R and the left main wing 3L. Secondly, in the aircraft 1A and the composite structure 9 according to the second example implementation, the electrically-conductive composite member 20 included in the right main wing 3R and the electrically-conductive composite member 20 included in the left main wing 3L may be electrically coupled to each other. Other configurations and other example workings of the aircraft 1A and the composite structure 9A in the second example implementation may be substantially the same as those of the aircraft 1 and the composite structure 9 in the first example implementation. Therefore, a configuration, in the second example implementation, substantially the same as or corresponding to that in the first example implementation is denoted with the same symbol and will not be described further.

In the aircraft 1A and the composite structure 9A in the second example implementation, the first composite member 12A including the electrically-conductive composite member 20 may be included in part or all of the panels such as the upper panel 8U of the center wing 6 of the aircraft 1A or the lower panel 8L of the center wing 6 of the aircraft 1A, as with the aircraft 1 and the composite structure 9 in the first example implementation. Further, the second composite member 12B including the electrically-conductive composite member 20 may be included in part or all of the panels such as: the upper panel 7U of the right main wing 3R of the aircraft 1A; the lower panel 7L of the right main wing 3R of the aircraft 1A; the upper panel 7U of the left main wing 3L of the aircraft 1A; or the lower panel 7L of the left main wing 3L of the aircraft 1A.

Further, the electrically-conductive composite member 20 may be shared by part or all of the first composite member 12A included in the panel such as the lower panel 8L of the center wing 6 and part or all of the second composite member 12B included in the panel such as the lower panel 7L of the right main wing 3R or the lower panel 7L of the left main wing 3L as exemplarily illustrated in FIG. 7. The electrically-conductive composite member 20 described above may include a stack of fiber-reinforced layers shared by at least by part of the first composite member 12A included in the panel such as the lower panel 8L of the center wing 6 and at least part of the second composite member 12B included in the panel such as the lower panel 7L of the right main wing 3R or the lower panel 7L of the left main wing 3L. In other words, the electrically-conductive composite member 20 in the first composite member 12A and the second composite member 12B may include a stack of fiber-reinforced layers that are shared by the first composite member 12A and the second composite member 12B. Therefore, the panels of the center wing 6 may be coupled to the panels of each of the right main wing 3R and the left main wing 3L not only by means of the brackets 11 but also by means of the electrically-conductive composite member 20. In the example illustrated in FIG. 7, the electrically-conductive composite member 20 stacked, as the PadUp portion, on the non-electrically-conductive composite member 21 may be shared by the panel of the center wing 6 and the panel of each of the right main wing 3R and the left main wing 3L.

Therefore, a lightning current flowing from the wingtip of any of the right main wing 3R and the left main wing 3L toward the center wing 6 may flow into the center wing 6 not only via the brackets 11 but also via the electrically-conductive composite member 20. Further, when a gap between the first composite member 12A included in the center wing 6 and the second composite member 12B included in any of the right main wing 3R and the left main wing 3L is provided with the adhesive 41 which has electric conductivity as with the first example implementation, the adhesive 41 may also serve as a path of the lightning current.

Further, as illustrated in FIG. 6, the electrically-conductive composite member 20 included in the panel of the right main wing 3R and the electrically-conductive composite member 20 included in the panel of the left main wing 3L may be coupled to each other by means of an electric conductor 50. The electric conductor 50 may include the electrically-conductive composite member 20 included in part or all of the panel of the center wing 6. The electric conductor 50 may include only electrically-conductive composite member 20, or may include electrically-conductive composite member 20 and a metallic wire.

The above-described configuration allows a lightning current that has flown from the wingtip of one of the right main wing 3R and the left main wing 3L into the center wing 6 or a flow of electrons from the wingtip of one of the right main wing 3R and the left main wing 3L into the center wing 6 to be guided to the wingtip of the other of the right main wing 3R and the left main wing 3L. In other words, in a case where the wingtip of one of the right main wing 3R and the left main wing 3L is struck by lightning, electric discharge is allowed to occur at the wingtip of the other of the right main wing 3R and the left main wing 3L.

It is to be noted that, as with the first example implementation, the electrically-conductive composite member 20 included in part or all of the panel included in the center wing 6 may be coupled to the electric conductor 40 having an end provided at the front end of the aircraft 1, the rear end of the aircraft 1A, or both in one example. In such an example, part of the lightning current or the flow of electrons from any of the right main wing 3R and the left main wing 3L to the center wing 6 is guided to the front end of the aircraft 1A, the rear end of the aircraft 1A, or both. In one example, each electrically-conductive composite member 20 included in the center wing 6 may be coupled to both of the electric conductor 40 and the electric conductor 50. The electric conductor 40 may have an end disposed at the front end of the aircraft 1A, the rear end of the aircraft 1A, or both. The electric conductor 50 may couple the electrically-conductive composite members 20 included in the center wing 6 to each other. Thus, a probability that the lightning current is dispersed is increased.

Other Example Implementations

Although some implementations of the technology have been described in the foregoing, the implementations described above are merely illustrative and should not be construed as limiting the scope of the technology. The novel method and apparatus described herein as example implementations of the technology may be embodied in the form of any other implementation. Further, it should be appreciated that various omissions, modifications, and alterations may be made to example implementations of the technology described herein without departing from the scope as defined by the appended claims. The appended claims and equivalents are intended to encompass such omissions, modifications, and alterations as various implementations and modifications examples of the technology in so far as they fall within the scope of the appended claims or the equivalents thereof.

For example, although a case where each of the composite structure 9 and the composite structure 9A is an aircraft structure has been described above in the foregoing example implementations, this is non-limiting. For example, each of the composite structure 9 and the composite structure 9A may serve as any other structure such as an automobile structure.

The invention claimed is:

1. A composite structure comprising:
   at least one composite member having a through hole; and
   at least one fastener that is inserted in the through hole and couples the composite member and another part to each other,
   the at least one composite member including an electrically-conductive composite member provided at least in part or all of a through-hole portion, the through-hole portion being a portion, of the at least one composite member, having the through hole,
   the electrically-conductive composite member having a thickness that is greater in a portion, of the electrically-conductive composite member, included in the through-hole portion than in a portion, of the electrically-conductive composite member, other than the through-hole portion, and
   the electrically-conductive composite member including fiber reinforced plastics that comprise electrically-conductive resin reinforced by fibers,
   wherein the at least one composite member partially includes a non-electrically-conductive composite member, and
   wherein the at least one composite member includes a stack including the non-electrically-conductive composite member that has a uniform thickness and a plate shape and the electrically-conductive composite member that has a non-uniform thickness and a plate shape.

2. The composite structure according to claim 1, wherein the thickness of the electrically-conductive composite member is gradually increased in a direction from a portion, of the electrically-conductive composite member away from the through hole toward the through hole.

3. The composite structure according to claim 1, further comprising
   a pair of brackets coupled, by the at least one fastener, to the at least one composite member on both sides of the at least one composite member, wherein
   the thickness of the electrically-conductive composite member is greater in a portion, of the electrically-conductive composite member, positioned between the pair of brackets than in a portion, of the electrically-conductive composite member, other than the portion provided between the pair of brackets.

4. The composite structure according to claim 1, wherein the at least one fastener has electric conductivity and is inserted in the through hole without being in contact with the at least one composite member.

5. The composite structure according to claim 1, wherein the at least one fastener has electric conductivity and is inserted in the through hole with being in contact with the at least one composite member.

6. A composite structure comprising:
   at least one composite member having a through hole; and
   at least one fastener that is inserted in the through hole and couples the composite member and another part to each other, the at least one composite member including an electrically-conductive composite member provided at least in part or all of a through-hole portion, the through-hole portion being a portion, of the at least one composite member, having the through hole, the electrically-conductive composite member having a thickness that is greater in a portion, of the electrically-conductive composite member, included in the through-hole portion than in a portion, of the electrically-conductive composite member, other than the through-hole portion, and the electrically conductive composite member including fiber reinforced plastics that comprising electrically-conductive resin reinforced by fibers, wherein the at least one composite member comprises a first composite member having a first through hole and a second composite member having a second through hole;

a bracket is provided that couples the first composite member and the second composite member to each other;

the at least one fastener comprised a first fastener that is inserted in the first through hole and couples the first composite member and the bracket to each other and a second fastener that is inserted in the second through hole and couples the second composite member and the bracket to each other, the first composite member and the second composite member include an electrically-conductive composite member provided at least in part or all of a first through-hole portion and a second through-hole portion, respectively, the first through-hole portion being a portion, of the first composite member, having the first through hole, the second through-hole portion being a portion, of the second composite member, having the second through hole, the electrically-conductive composite member has a thickness that is greater in a portion, of the electrically-conductive composite member, included in the first through-hole portion and the second through-hole portion than in a portion, of the electrically-conductive composite member, other than the first through-hole portion and the second through-hole portion.

7. The composite structure according to claim 6, further comprising an adhesive provided in a gap between the first composite member and the second composite member, and having electric conductivity.

8. The composite structure according to claim 6, wherein the electrically-conductive composite member included in the first composite member and the second composite member includes a stack of fiber reinforced layers shared by the first composite member and the second composite member.

9. The composite structure according to claim 6, further comprising an electric conductor, wherein the first composite member is included, as a center-panel first composite member, in part or all of a panel of a center wing of an aircraft, the second composite member is included, as a right-main-wing second composite member, in part or all of a panel of a right main wing of the aircraft, the second composite member is included, as a left-main-wing second composite member, in part or all of a panel of a left main wing of the aircraft, the electric conductor includes the electrically-conductive composite member included in the center-panel first composite member, and couples the electrically-conductive composite member included in the right-main-wing second composite member and the electrically-conductive composite member included in the left-main-wing second composite member to each other.

10. The composite structure according to claim 6, further comprising an electric conductor having an end disposed at a front end of an aircraft, a rear end of the aircraft, or both, wherein the first composite member is included, as a center-panel first composite member, in part or all of a panel of a center wing of the aircraft, the second composite member is included in part or all of a panel of a main wing of the aircraft, the electrically-conductive composite member included in the center-panel first composite member is coupled to the electric conductor.

11. An aircraft comprising the composite structure according to claim 1.

12. A lightning current guiding method comprising:

making at least part or all of a through-hole portion of a composite member with an electrically-conductive composite member, the composite member being included in a composite structure, the composite member having a through hole and being coupled to another part by a fastener, the fastener being inserted in the through hole of the composite member, the through-hole portion being a portion, of the composite member, having the through hole, the electrically-conductive composite member including fiber reinforced plastics that comprise electrically-conductive resin reinforced by fibers;

causing the electrically-conductive composite member to have a thickness that is greater in a portion, of the electrically-conductive composite member, included in the through-hole portion than in a portion, of the electrically-conductive composite member, other than the through-hole portion; and guiding a lightning current to the electrically-conductive composite member, wherein the at least one composite member partially includes a non-electrically-conductive composite member, and wherein the at least one composite member includes a stack including the non-electrically-conductive composite member that has a uniform thickness and a plate shape and the electrically-conductive composite member that has a non-uniform thickness and a plate shape.

13. The composite structure according to claim 1, wherein the electrically-conductive resin includes resin mixed with carbon, resin mixed with metallic powder, or resin mixed with an electrically-conductive polymer, and the fibers includes carbon fibers.

14. The lightning current guiding method according to claim 12, wherein the electrically-conductive resin includes resin mixed with carbon, resin mixed with metallic powder, or resin mixed with an electrically-conductive polymer, and the fibers includes carbon fibers.

* * * * *